(12) United States Patent
Bosen

(10) Patent No.: US 7,278,818 B2
(45) Date of Patent: Oct. 9, 2007

(54) TURBOMACHINE FOR LOW TEMPERATURE APPLICATIONS

(75) Inventor: Werner Bosen, Köln (DE)

(73) Assignee: Atlas Copco Energas GmbH, Köln (DE)

(*) Notice: Subject to any disclaimer, the term of this patent is extended or adjusted under 35 U.S.C. 154(b) by 0 days.

(21) Appl. No.: 11/452,587

(22) Filed: Jun. 14, 2006

(65) Prior Publication Data
US 2007/0041846 A1   Feb. 22, 2007

(30) Foreign Application Priority Data
Aug. 18, 2005   (DE)   ............... 10 2005 039 033

(51) Int. Cl.
*F04D 29/58*   (2006.01)
(52) U.S. Cl. ............ 415/47; 415/149.1; 415/116; 415/180
(58) Field of Classification Search ......... 415/116, 415/149.1, 150, 151, 47, 178, 180
See application file for complete search history.

(56) References Cited

U.S. PATENT DOCUMENTS

| 4,792,278 | A |  | 12/1988 | Emerson |  |
| 5,980,218 | A |  | 11/1999 | Takahashi et al. |  |
| 6,464,469 | B1 | * | 10/2002 | Grob et al. | 417/251 |
| 7,186,093 | B2 | * | 3/2007 | Goshi | 417/53 |

FOREIGN PATENT DOCUMENTS

DE   103 10 677   10/2004

* cited by examiner

*Primary Examiner*—Ninh H. Nguyen
(74) *Attorney, Agent, or Firm*—Collard & Roc, P.C.

(57) ABSTRACT

A turbomachine for low-temperature applications has a housing, a rotor shaft disposed in the housing, an impeller disposed on one shaft end of the rotor shaft, to which a cold gas is applied, and an electrical machine integrated into the housing. During operation of the turbomachine, a cold zone (K) forms within the housing, in the impeller-side end, and a warm zone (W) forms at the end facing away from the impeller. The housing has at least two compressed gas connectors for a compressed gas, of which one connector is disposed in the cold zone (K), and the other is disposed in the warm zone (W). A control device establishes the flow-through direction for the compressed gas based on temperatures in the cold and warm zones, and controls valve devices on the compressed gas connectors accordingly.

6 Claims, 1 Drawing Sheet

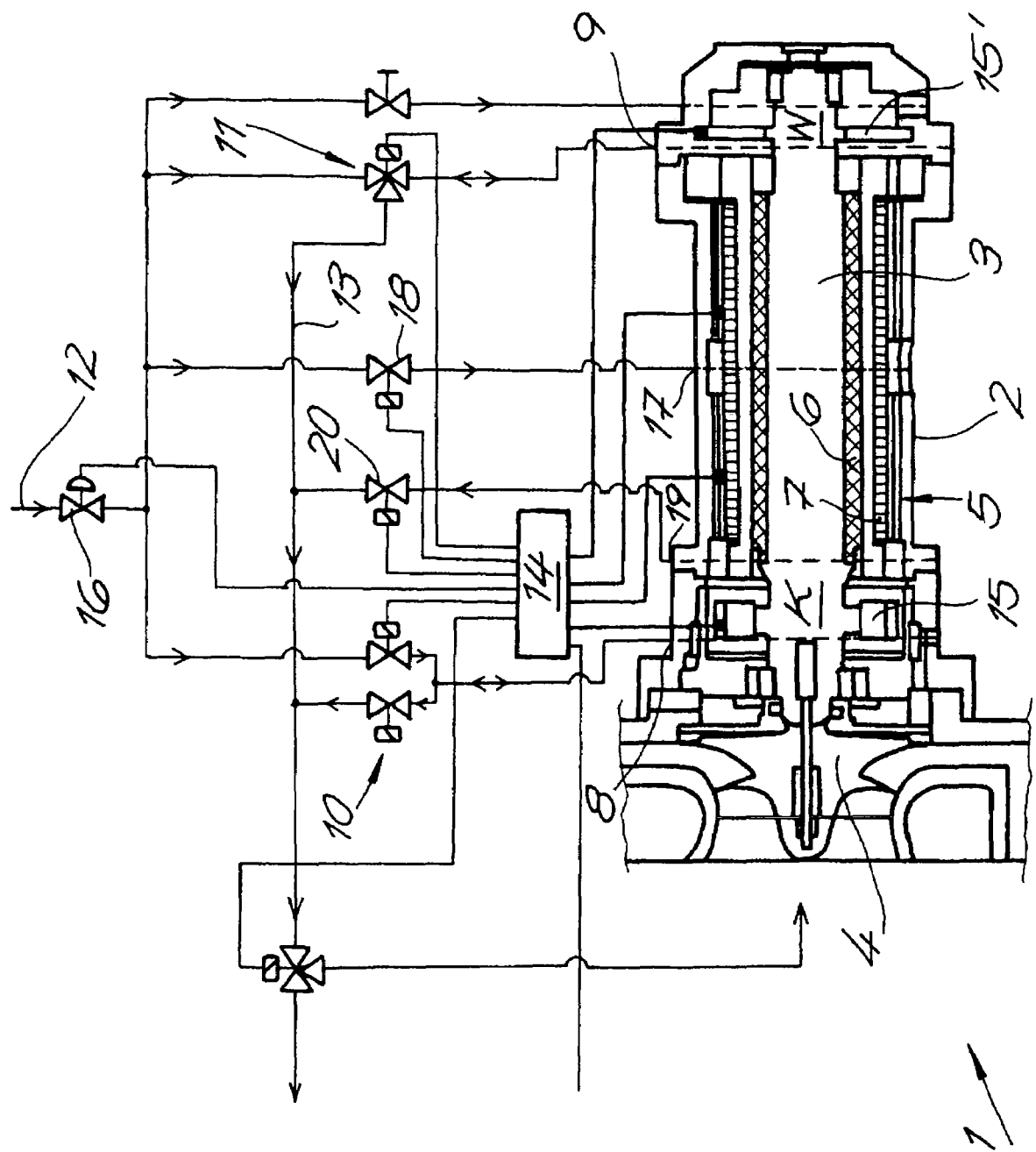

TURBOMACHINE FOR LOW TEMPERATURE APPLICATIONS

BACKGROUND OF THE INVENTION

1. Field of the Invention

The invention relates to a turbomachine for low-temperature applications, having a housing, a rotor shaft mounted in the housing, an impeller disposed on a shaft end of the rotor shaft, to which a cold gas is applied, and an electrical machine integrated into the housing. The electrical machine has a rotor disposed on the rotor shaft and stator windings disposed on the housing. A cold zone forms within the housing, in the impeller-side end, during operation of the turbomachine, and a warm zone forms at the end facing away from the impeller.

2. The Prior Art

Turbomachines having the above-mentioned characteristics are described in German Patent No. DE 103 10 677 A1 and from practice, in various embodiments., and are used for compression and transport of evaporating liquid gas (LNG) or for relaxation of gases in connection with the cryogenic decomposition of air. The electrical machine works either as a drive motor of a turbocompressor, or as an energy-recovering power generator for braking an expansion turbine. Turbomachines in which the impeller and the rotor of the electrical machine are disposed on a common shaft are operated at high speeds of rotation, resulting in significant heat development, both in the electrical machine and in the shaft bearings. Because of operation of the turbomachine in the low-temperature range, great temperature gradients can occur in the housing, and the temperature progression is dependent on the method of operation of the turbomachine. Thus, in full-load operation, for example, at the maximum operational speed of rotation, the heat development in the electrical machine as well as in the bearings, particularly at the free shaft end, which heat development is not insignificant, will result in significant heating, which requires cooling, in order to protect the bearings and parts of the electrical machine against thermal overheating. In partial-load operation, i.e., at low power of the electrical machine, at a possibly reduced speed of rotation, the impeller-side end of the electrical machine as well as the impeller-side bearing are cooled extremely, specifically as a result of the heat exchange between the housing interior of the electrical machine and the bearing, and the low-temperature stage of the turbomachine. In addition, there are possible cold gas leaks from the turbomachine stage into the housing of the electrical machine, which is flanged on. Then, if the temperature goes below a permissible minimum temperature for the materials that are used in the electrical machine and in the bearings, this region must be heated.

Generally, only one compressed gas source is available for cooling and heating, for example instrument air, blocking nitrogen, or clean process gas, which is mostly available at a temperature between 10° C. and 40° C. The gas that is available as a compressed gas source, whether it is instrument air, blocking nitrogen, or clean process gas, is too warm for effective cooling and too cold for effective heating. A significant compressed gas volume stream is required both for heating the cold zone and for cooling the warm zone of the housing, which stream has a negative influence on the operating costs of the turbomachine, or actually makes additional investments for compressed gas volume production necessary.

U.S. Pat. No. 4,792,278 describes a turbomachine that is structured as a multi-stage turboexpander. The turboexpander has a rotor shaft mounted in a housing, with two end-side impellers and one rotor set onto the shaft, which works together with stator windings in the housing, as a generator. A compressed gas is first expanded in a first turbine stage, and subsequently in a second turbine stage of one of the impellers. The gas drives the generator, losing pressure, and is cooled. The gas is first guided through the first expansion stage at the end of the impeller assigned to the shaft, and subsequently through the second expansion stage at the front end of the impeller. The gas stream that is guided through the first expansion stage cools the impeller and insulates the gas stream that is guided through the second expansion stage from the housing.

U.S. Pat. No. 5,980,218 relates to a two-stage compressor having a rotor shaft mounted in a housing. The electrical machine that drives the shaft is formed by a rotor disposed on the rotor shaft and a stator winding disposed in the housing. An impeller is disposed on the ends of the rotor shaft, in each instance. Air drawn in from the surroundings is compressed in a first compression stage, and cooled in a gas cooler. Part of the gas compressed in the first compression stage and subsequently cooled is passed into the housing as a cooling gas stream, to cool the electrical machine, by way of bypass valves. The cooling gas flows through the electrical machine essentially radially, and is passed to the approach of the first compression stage via outlet openings.

SUMMARY OF THE INVENTION

It is therefore an object of the invention to provide a device for a turbomachine that automatically minimizes the amount of compressed gas necessary for temperature equalization in the housing, for all operating conditions of the turbomachine.

This object is accomplished according to the invention by a turbomachine for low-temperature applications having (a) a housing, (b) a rotor shaft mounted in the housing, (c) an impeller disposed on one shaft end of the rotor shaft, to which a cold gas is applied, and (d) an electrical machine integrated into the housing, which has a rotor disposed on the rotor shaft and stator windings disposed in the housing.

A cold zone forms within the housing, in the impeller-side end, during operation of the turbomachine, and a warm zone forms at the end facing away from the impeller. The housing has at least two compressed gas connectors for a compressed gas, of which one connector is disposed on a housing segment assigned to the cold zone, and the other connector is disposed on a housing segment assigned to the warm zone. A valve device is assigned to each of the compressed gas connectors, which alternatively connects the compressed gas connector with a compressed gas feed line or an outflow line. The valve devices are connected with a control device that establishes the flow-through direction for the compressed gas on the basis of the temperatures occurring in the cold zone and the warm zone, and controls the valve devices accordingly. To reduce overheating in the warm zone, for example in full-load operation, the compressed gas flows into the housing through the compressed gas connector assigned to the cold zone, and leaves the housing through the compressed gas connector in the warm zone. The in-flowing gas is first cooled further, by means of the cold environment of the cryogenic turbomachine, and by means of possible cold gas leaks from this stage, before it reaches the overheated regions of the electrical machine and the bearings, and thereby cools them more effectively, i.e., with a lower amount of gas.

For the purpose of heating the cold zone, for example in partial-load operation of the turbomachine, the valve devices are set so that the compressed gas flows into the housing through the compressed gas connector assigned to the warm zone, and leaves the housing through the compressed gas connector in the cold zone. In this case, the compressed gas that flows into the housing is first heated further, by the warm environment of the electrical machine, before it reaches the super-cooled regions of the electrical machine and the bearing, and thereby heats them more effectively, i.e., with a lower amount of gas.

The rotor shaft, the stator windings of the electrical machine and the bearings at both ends of the rotor shaft are in a heat exchange with the compressed gas. The amount of compressed gas supplied to the housing is regulated, as a function of temperature, in such a manner that in full-load operation, the temperature in the warm zone remains within a predetermined temperature range, and in partial-load operation, a temperature that also lies within a predetermined temperature window is adjusted in the cold zone. Therefore, a regulating valve for regulating the gas volume stream as a function of the temperatures that occur in the cold zone and in the warm zone is preferably disposed in the compressed gas feed line.

The valve devices can be configured as three-way valves, which are connected with a compressed gas connector of the housing, the compressed gas feed line, and the outflow line, in each instance.

The housing can have a third compressed gas connector in a center housing segment, between the warm zone and the cold zone, which is connected with the compressed gas feed line. An open/closed valve switched by the control device is disposed in the connecting line between the third compressed gas connector and the compressed gas feed line. This configuration also allows a symmetrical gas distribution of the compressed gas within the housing. A symmetrical gas distribution occurs if the compressed gas is fed into the housing through the third compressed gas connector, with the valve open, and the valve devices of the two other compressed gas connectors are switched in such a manner that part of the compressed gas leaves the compressed gas connector in the cold zone, and another part of the compressed gas leaves the compressed gas connector in the warm zone. The symmetrical gas distribution in the housing is provided for the case of an indifferent temperature development in the electrical machine, which generally occurs only for a short period of time. Such an indifferent temperature development occurs, for example, if the turbomachine temporarily has to be operated with a warm gas, instead of with a cryogenic gas, as is the case in permanent operation, and both ends of the electrical machine and both end-side bearings must be cooled during this short-term operation.

In another embodiment, the housing has a gas outlet for the compressed gas connected with the outflow line, between the third compressed gas connector and the compressed gas connector of the cold zone, and that a shut-off valve switched by the control device is disposed in the connecting line between the gas outlet and the outflow line. This configuration allows cooling of the warm region and heating of the cold region at the same time, when greater consumption of compressed gas has to be accepted. When the valve is open, the compressed gas flows into the housing through the third compressed gas connector, and leaves the housing through the compressed gas connector in the warm zone. The valve device assigned to this compressed gas connector is switched in such a manner that the compressed gas connector of the warm zone is connected with the outflow line.

A second compressed gas stream flows through the compressed gas connector disposed in the cold zone, directly into the segment of the housing that is adjacent to the impeller, i.e. the low-temperature stage of the turbomachine, and leaves the housing through the gas outlet that is connected with the outflow line, which outlet is disposed between the compressed gas connector of the cold zone and the third compressed gas connector. The flow guidance described is intended for a case that is actually rare, where overheating at the free end of the electrical machine is simultaneously accompanied by impermissible super-cooling of the impeller-side end. This case occurs only for a short period of time and can be triggered, for example, due to the fact that a greater leakage stream of cold gas enters into the housing through defective seals, or strong heating occurs due to the start of bearing damage at the free shaft end.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

The single FIGURE schematically shows a longitudinal cross-section through one embodiment of a turbomachine having an integrated motor drive according to the invention.

DETAILED DESCRIPTION OF THE PREFERRED EMBODIMENT

The turbomachine shown in the FIGURE is a single-stage turbocompressor for drawing off and compressing hydrogen gas, which occurs during the storage of a cryogenic liquid, due to evaporation. The turbocompressor stage-draws the gas in at ambient pressure and at a temperature of $-140°$ C., for example, and compresses it to approximately 2 bar (1 bar excess pressure), whereby the gas heats up to approximately $-110°$ C. The integrated electrical drive typically has a power of about 1200 kW at a speed of rotation of 12,000 $min^{-1}$.

The turbomachine has a compressor stage 1 that works in the low-temperature range, and a housing 2 that is flanged onto the compressor stage. A rotor shaft 3 is mounted in housing 2, and impeller 4 of compressor stage 1, to which a cold gas is applied, is disposed at the shaft end of the housing 2. An electrical machine 5 is integrated into housing 2, which machine has a rotor 6 disposed on rotor shaft 3, and stator windings 7 disposed in the housing. During operation of the turbomachine, a cold zone K forms within housing 2, at the impeller-side end, and a warm zone W forms at the end that faces away from the impeller. Housing 2 has at least two compressed gas connectors 8, 9 for a compressed gas, of which one connector 8 is disposed on a housing segment assigned to the cold zone K, and the other connector 9 is disposed on a housing segment assigned to the warm zone W. Compressed gas connectors 8, 9 each have a valve device 10, 11 assigned to them, which alternatively connects the compressed gas connector with a compressed gas feed line 12 or an outflow line 13 and, in the exemplary embodiment, has a three-way valve that is connected with compressed gas connector 8 or 9 of the housing, compressed gas feed line 12, and outflow line 13.

Valve devices 10, 11 are connected with a control device 14 that establishes the flow-through direction for the compressed gas on the basis of the temperatures occurring in the cold zone K and the warm zone W, and controls valve devices 10, 11 accordingly. During flow through housing 2, rotor shaft 3, stator windings 7, bearings 15, 15' at the two ends of rotor shaft 3 are in heat exchange with the compressed gas.

In order to reduce overheating in the warm zone W, which primarily occurs during full-load operation, valve devices 10, 11 are switched in such a manner that the compressed gas flows into housing 2 through compressed gas connector 8 assigned to the cold zone K, and leaves the housing through compressed gas connector 9 in the warm zone W. In this case, the compressed gas is first introduced into the cold region of electrical machine 5, from where it is guided by means of gaps and suitable heat exchanger surfaces in the housing of the electrical machine and of the corresponding bearing 15, and first cools off further there, before it necessarily reaches the overheated parts of the electrical machine and of bearing 15', where it then can absorb more heat per volume stream unit, for cooling these parts, than if it were introduced there without being cooled.

Primarily in partial-load operation of the turbomachine, heating at the free shaft end is not critical, but instead, cooling at the impeller-side end is, in other words close to the turbocompressor stage 1. In partial-load operation, i.e., at a low power of the electrical machine, at a possibly reduced speed of rotation, the impeller-side end of electrical machine 5 as well as impeller-side bearing 15 are cooled off by means of heat exchange between the housing interior of electrical machine 5 and of bearing 15, towards the low-temperature stage of the turbomachine, as well as possible cold gas leaks from the compressor stage 1 into housing 2 of the electrical machine 5 that is flanged on. In this case, valve devices 10, 11 are switched by control device 14 in such a manner that the compressed gas flows into housing 2 through the compressed gas connector 9 assigned to the warm zone W, for the purpose of heating the cold zone K, and leaves the housing through the compressed gas connector 8 in the cold zone K. The compressed gas is first introduced into the warm region of electrical machine 5, from where it is guided by means of the gaps and heat exchanger surfaces in the housing of the electrical machine as well as of the corresponding bearing 15', and first heats up further there, before it reaches the super-cooled parts, where it can then give off more heat per volume stream unit, to heat these parts, than if it were introduced there without being heated.

The compressed gas volume stream is regulated as a function of the temperatures that occur in cold zone K and warm zone W. For this purpose, a regulating valve 16 is disposed in compressed gas feed line 12, which is connected with control device 14. Valve devices 10, 11 are then switched as a function of the temperature profile that occurs in housing 2. In a so-called "cooling mode," the compressed gas volume stream is passed to compressed gas connector 9 in the warm zone W. In a "heating mode," the compressed gas flows in through the compressed gas connector 8 of cold zone K. The control device determines whether the "cooling mode" or the "heating mode" should be set, on the basis of the temperature profile determined in the housing.

Housing 2 still has a third compressed gas connector 17 in a center housing segment between warm zone W and cold zone K, which connector is connected with the compressed gas feed line 12. An open/closed valve 18 switched by control device 14 is disposed in the connecting line between the third compressed gas connector 17 and compressed gas feed line 12.

Furthermore, housing 2 has a gas outlet 19 for the compressed gas, connected with outflow line 13 between the third compressed gas connector 17 and compressed gas connector 8 of cold zone K, whereby a shut-off valve 20, also controlled by the control device, is disposed in the connecting line between gas outlet 19 and outflow line 13. With this configuration, it is possible to feed the compressed gas into housing 2 in a center housing segment between cold zone K and warm zone W, whereby the compressed gas stream divides up and leaves the housing both through compressed gas connector 9 of warm zone W and through gas outlet 19 disposed close to the cold zone. Using the arrangement described, a symmetrically divided flow through the electrical machine 5 is possible.

In addition, compressed gas can be supplied to cold zone K in targeted manner, through compressed gas connector 8 on the impeller wheel side, which gas heats the parts of electrical machine 5 adjacent to compressor stage 1, and bearing 15 that is also disposed in this region, and leaves the housing through gas outlet 19. The symmetrically divided flow through electrical machine 5, if necessary in combination with an additional compressed gas stream fed into the cold zone, is provided for the rather rare cases in which the free end of electrical machine 5 overheats in warm zone W and, at the same time, the region adjacent to compressor stage 1 is super-cooled, or if both regions are overheated. These operating cases are generally of short duration, and occur if the turbomachine temporarily has to be operated with a warm transport gas, instead of a deeply cold transport gas, as in permanent operation, or if, for example, a greater leakage flow of cold gas enters into housing 2 that surrounds the electrical machine, due to a defective seal.

In the embodiment shown, the turbomachine has magnetic bearings as bearings 15, 15'. Gas bearings or roller bearings can also be used in place of magnetic bearings.

In the embodiment shown, impeller 4 is a turbocompressor impeller, which is driven by rotors 6 of electrical machine 5. The turbomachine works as a turbocompressor. The invention is just as suitable if the turbomachine stage is not a compressor stage but rather a turbine stage, i.e. if impeller 4 is designed as a turbine wheel, and electrical machine 5 is operated as a generator.

Accordingly, while only a few embodiments of the present invention have been shown and described, it is obvious that many changes and modifications may be made thereunto without departing from the spirit and scope of the invention.

What is claimed is:

1. Turbomachine for low-temperature applications, comprising:
    a housing;
    a rotor shaft mounted in the housing;
    an impeller disposed on one end of the rotor shaft, to which a cold gas is applied, wherein a cold zone (K) forms within the housing in an impeller-side end of the housing during operation of the turbomachine, and a warm zone (W) forms at an end of the housing facing away from the impeller;
    an electrical machine integrated into the housing, said electrical machine comprising a rotor disposed on the rotor shaft and stator windings disposed in the housing;
    at least two compressed gas connectors for a compressed gas, one of said connectors being disposed on a housing segment assigned to the cold zone (K), and the other of said connectors being disposed on a housing segment assigned to the warm zone (W);

at least two valve devices, each valve device being assigned to a respective one of the compressed gas connectors, said valve devices alternately connecting each compressed gas connector with a compressed gas feed line or an outflow line; and a control device connected to the valve devices, said control device establishing a flow-through direction for the compressed gas on the basis of temperatures occurring in the cold zone (K) and the warm zone (W), and controlling the valve devices accordingly.

2. A turbomachine according to claim 1, wherein the rotor shaft, the stator windings, and bearings at both ends of the rotor shaft are in a heat exchange with the compressed gas.

3. A turbomachine according to claim 1, further comprising a regulating valve for regulating gas volume stream as a function of temperatures that occur in the cold zone (K) and in the warm zone (W), said regulating valve being disposed in the compressed gas feed line.

4. A turbomachine according to claim 1, wherein the valve devices have three-way valves that are each connected with one of the compressed gas connectors of the housing, the compressed gas feed line, and the outflow line, by means of lines.

5. A turbomachine according to claim 1, further comprising:

a third compressed gas connector in a center housing segment, between the warm zone (W) and the cold zone (K), said third compressed gas connector being connected with the compressed gas feed line (12); and an open/closed valve switched by the control device disposed in the connecting line between the third compressed gas connector and the compressed gas feed line.

6. A turbomachine according to claim 5, further comprising:

a gas outlet for the compressed gas, said gas outlet being connected with the outflow line, between the third compressed gas connector and the compressed gas connector of the cold zone (K); and a shut-off valve disposed in the connecting line between the gas outlet and the outflow line.

* * * * *